US012319570B2

United States Patent
Nam et al.

(10) Patent No.: US 12,319,570 B2
(45) Date of Patent: Jun. 3, 2025

(54) METHOD OF MAKING ALUMINUM NITRIDE FOAM

(71) Applicant: CellMo Materials Innovation, Inc., Berkeley, CA (US)

(72) Inventors: Kyungju Nam, Seoul (KR); Heeman Choe, Walnut Creek, CA (US)

(73) Assignee: CellMo Materials Innovation, Inc., Conroe, TX (US)

( * ) Notice: Subject to any disclaimer, the term of this patent is extended or adjusted under 35 U.S.C. 154(b) by 1284 days.

(21) Appl. No.: 16/652,670

(22) PCT Filed: Oct. 2, 2018

(86) PCT No.: PCT/US2018/054039
§ 371 (c)(1),
(2) Date: Mar. 31, 2020

(87) PCT Pub. No.: WO2019/070767
PCT Pub. Date: Apr. 11, 2019

(65) Prior Publication Data
US 2020/0239312 A1   Jul. 30, 2020

Related U.S. Application Data

(60) Provisional application No. 62/567,201, filed on Oct. 2, 2017.

(51) Int. Cl.
*C01B 21/072* (2006.01)
*C04B 35/581* (2006.01)
*C04B 38/00* (2006.01)

(52) U.S. Cl.
CPC ........ *C01B 21/0722* (2013.01); *C04B 35/581* (2013.01); *C04B 38/0054* (2013.01);
(Continued)

(58) Field of Classification Search
CPC ............... C04B 35/581; C04B 38/0054; C01P 2006/16; C01P 2006/17
See application file for complete search history.

(56) References Cited

U.S. PATENT DOCUMENTS

| | | |
|---|---|---|
| 5,185,297 A | 2/1993 | Park et al. |
| 2003/0097800 A1* | 5/2003 | Ramanath ............ B24D 99/005 51/309 |
| 2009/0038797 A1 | 2/2009 | Skala et al. |

OTHER PUBLICATIONS

International Search Report, PCT Application PCT/US2018/054039, Dec. 18, 2018, 6 pages.

* cited by examiner

*Primary Examiner* — Bryan D. Ripa
*Assistant Examiner* — Cameron K Miller
(74) *Attorney, Agent, or Firm* — Aka Chan LLP

(57) ABSTRACT

Porous aluminum nitride (AlN) provides a greater surface area and higher permeability, which is especially desirable for advanced functional application. Porous or bulk aluminum nitride is very difficult to manufacture due mainly to its high melting point (e.g., 2200 degrees Celsius). A new processing method synthesizes porous aluminum nitride through a complete transformation from porous aluminum using a remarkably low nitriding or sintering temperature. The manufactured porous aluminum nitride foam can be used for such applications as filters, separators, heat sinks, ballistic armor, electronic packaging, light- and field-emission devices, and highly wear-resistant composites when infiltrated with metal such as aluminum, titanium, or copper.

16 Claims, 7 Drawing Sheets

(52) U.S. Cl.
CPC ...... *C01P 2002/72* (2013.01); *C01P 2004/03* (2013.01); *C01P 2006/16* (2013.01); *C01P 2006/17* (2013.01)

METHOD OF MAKING ALUMINUM NITRIDE FOAM

CROSS-REFERENCE TO RELATED APPLICATIONS

This patent application is a section 371 national phase filing of PCT patent application PCT/US2018/054039, filed Oct. 2, 2018, which claims the benefit of U.S. patent application 62/567,201, filed Oct. 2, 2017.

BACKGROUND OF THE INVENTION

This invention relates to the field of materials and more specifically to aluminum nitride foam and its fabrication.

Aluminum nitride (AlN) possesses an excellent combination of material properties, including high thermal conductivity (up to 180 Watts per meter per Kelvin), excellent thermal expansion (4.2 parts per million per degree Celsius), a relatively low dielectric constant (ca. about 8), good mechanical strength (hardness: 16.6 gigapascals), and non-toxicity. Furthermore, aluminum nitride has been considered an attractive reinforcing phase in Al-matrix composites. For example, the manufactured aluminum nitride foam can be infiltrated with molten metal such as Al, Cu, Ti to form a strong, tough composite with exceptional wear resistance. The aluminum nitride foam can also provide large surface area and high permeability for various functional applications such as filters, separators, heat sinks, ballistic armor, electronic packaging, and light- and field-emission devices.

Despite the promising and diverse applicability of aluminum nitride, there are technical difficulties against its fabrication. This is mainly because a considerably high temperature (greater than about 1600 degrees Celsius) is usually needed to achieve a complete ceramic structure of aluminum nitride using a good sintering process. Furthermore, they also necessitate the help of an additive, such as yttrium oxide (Y2O3) and calcium oxide (CaO), which were able to promote densification through liquid-phase sintering or uniaxial pressure.

Therefore, this invention relates to the field of novel fabrication method of aluminum nitride foam (porous aluminum nitride) for its potential applications in filters, separators, heat sinks, ballistic armor, electronic packaging, light- and field-emission devices, and advanced composites. Its porous structure will provide such versatile applicability simply because it can provide a greater specific surface area and higher permeability than its bulk counterpart. Controlling the porosity of the aluminum nitride foam is important to enhance properties for its functional applications.

Previous porous aluminum nitride materials have limited porosities. Further, the materials were made using a very high sintering temperature of 1700 degrees Celsius with the help of an additive, such as yttrium oxide and calcium oxide, which were able to promote densification through liquid-phase sintering or uniaxial pressure.

This patent describes a new facile method based on the low-temperature synthesis of aluminum nitride foam. Remarkably, this novel method does not require an additive or pressure application for a sintering process and allows prepared green-body Al foam to directly sinter at almost one third (620 degrees Celsius) of the usual temperature previous high-temperature aluminum nitride's nitriding processes.

BRIEF SUMMARY OF THE INVENTION

Porous aluminum nitride (AlN) provides a greater surface area and higher permeability, which is especially desirable for advanced functional application. Porous or bulk aluminum nitride is very difficult to manufacture due mainly to its high melting point (e.g., 2200 degrees Celsius). A new processing method synthesizes porous aluminum nitride through a complete transformation from porous aluminum using a remarkably low nitriding or sintering temperature. The manufactured porous aluminum nitride foam can be used for such applications as filters, separators, heat sinks, ballistic armor, electronic packaging, light- and field-emission devices, and highly wear-resistant composites when infiltrated with metal such as aluminum, titanium, or copper.

The use of aluminum nitride (AlN) has recently begun to be explored for advanced functional applications. For some particular applications, it is more advantageous to use porous-structured aluminum nitride, simply because it can provide a greater surface area and higher permeability. However, porous or bulk aluminum nitride is very difficult to achieve due mainly to its high melting point (e.g., 2200 degrees Celsius). A new processing method synthesizes porous aluminum nitride through a complete transformation from porous aluminum (Al) using a remarkably low nitriding/sintering temperature (e.g., 620 degrees Celsius) as opposed to only the surface nitride AlN—Al core composite systems at or above 1000 degrees Celsius. A uniform microporous bead structure of porous aluminum nitride with a mean pore size of 74.0 plus or minus 27.7 microns was obtained that also contained nanoparticles ranging from 80 to 230 nanometers that covered the surface. The manufactured aluminum nitride foam in this invention can thus provide large surface area and high permeability for various functional applications such as filters, separators, heat sinks, ballistic armor, electronic packaging, light- and field-emission devices, and highly wear-resistant composites when infiltrated with metal such as aluminum, titanium, or copper.

A novel method of manufacturing three dimensionally (3D) connected aluminum nitride foam structure with large surface area and elongated channel pores (typically several to tens of micrometers in diameter and occasional nanometer pores a few tens to several hundreds of nanometers) within the three-dimensional (3D) porous structure is described, resulting in potential use for various functional applications; therefore, it can provide enhanced specific surface area and higher permeability than its bulk counterpart. This new material design exhibits improved properties for use in functional application.

This new technique is based on the low-temperature synthesis of aluminum nitride foam directly from Al powder green body, which was not previously known. Porous aluminum nitrides can be manufactured by two different methods: Both methods use a very high sintering temperature of 1700 degrees Celsius with the help of an additive, such as Y$_2$O$_3$ and CaO, with limited porosities (from 20 only up to 60 percent). On the other hand, this technique includes the fabrication of aluminum nitride foam with pore sizes ranging from several hundred nanometers to several micrometers (with occasional nanoscale pores) synthesized at low temperature of 620 degrees Celsius under nitrogen gas without any additive.

A novel method of manufacturing three-dimensional aluminum nitride foam is described for use in advanced functional applications such as filters, battery separators, and heat exchangers as well as advanced structural composites infiltrated with Al or Cu. This novel powder-based processing method is based on a combination of powder metallurgy (e.g., which can include freeze-casting) and thermal nitriding methods at unusually low temperature. It includes manufacturing aluminum (Al) green body using aluminum powder and polyvinyl alcohol binder with pore sizes ranging from several hundred nanometers to a few micrometers, and subsequently nitriding or sintering, or both, the aluminum green body under nitrogen gas for nitriding at a relatively or an unusually low temperature of 620 degrees Celsius.

This technique provides the first complete transformation from porous metallic aluminum to porous ceramic aluminum nitride by applying a facile direct low-temperature nitriding/sintering process in a flowing nitrogen atmosphere. Note that during the slurry preparation, in principle, the aluminum powder was most likely to oxidize thinly on its surface, making its sintering process extremely difficult. However, in the subsequent simultaneous nitriding and sintering process, the aluminum foam green body was completely nitrided at a "low" temperature of 620 degrees Celsius under nitrogen gas with the help of the carbothermal reaction of carbon in the PVA binder.

A unique morphology of aluminum nitride foam created by this technique exhibited agglomerates of small aluminum nitride nanoparticles in the range of about 80-230 nanometers on the surface, and these nanoparticles formed branches consisting of a number of nanoparticles stacked on top of each other. The growth of the branch agglomerates initiated from an aluminum nitride nuclei, which formed at the interface between the exposed aluminum and nitrogen bubbles, toward the outside the gas-melt interface due to the gradient of dissolved nitrogen.

A article of manufacture includes an aluminum nitride (AlN) foam having a porous structure with regularly distributed pores on the order of nanometers and micrometers, which has been manufactured through direct nitridation in a nitrogen atmosphere at relatively low temperature of less than about 1000 degrees Celsius. The aluminum nitride foam has a porosity of about 60 percent to 80 percent. The porosity of the aluminum nitride foam provides for large surface area and high permeability for various functional applications, which can include separators, heat sinks, ballistic armor, electronic packaging, light- and field-emission devices, and highly wear-resistant composites when infiltrated with a metal comprising at least one of aluminum, titanium, or copper.

For the aluminum nitride foam, the starting material was aluminum powder mixed with water or another solvent and a binder. A synthesis method includes a combination of slurry freezing or drying, or a combination, and thermal sintering or nitriding methods, or a combination.

A process of making the aluminum nitride (AlN) foam includes a low-temperature freezing or drying, or a combination of a prepared aluminum powder slurry to make aluminum foam green body. The process of making the aluminum nitride (AlN) foam includes subjecting an the aluminum foam green body to a simultaneous low-temperature nitrification and sintering process for a complete transformation to aluminum nitride foam in a nitrogen atmosphere, resulting in a three-dimensional pore structure with uniformly distributed pores. The uniformly distributed pores can be several to tens of micrometers in diameter and occasional nanometer pores. The uniformly distributed pores can be a few tens to several hundreds of nanometers The process of making does not require an additive or pressure application for a sintering or nitriding process, or a combination, and allows the aluminum foam green body to sinter at temperatures between about 500 degrees Celsius and about 900 degrees Celsius. The temperature used during sintering is substantially lower than previous sintering temperatures, such as almost one third of previous sintering temperatures. The temperature used during sintering allows for a low-temperature nitriding process that enables a less expensive and scalable manufacturing of aluminum nitride foam, which could not previously be achieved through the conventional a higher temperature aluminum nitride nitriding processes.

The binder can include a polyvinyl alcohol (PVA) binder or any other similar binder comprising carbon, or a combination. The binder is used in the preparation of water-based aluminum powder slurry.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
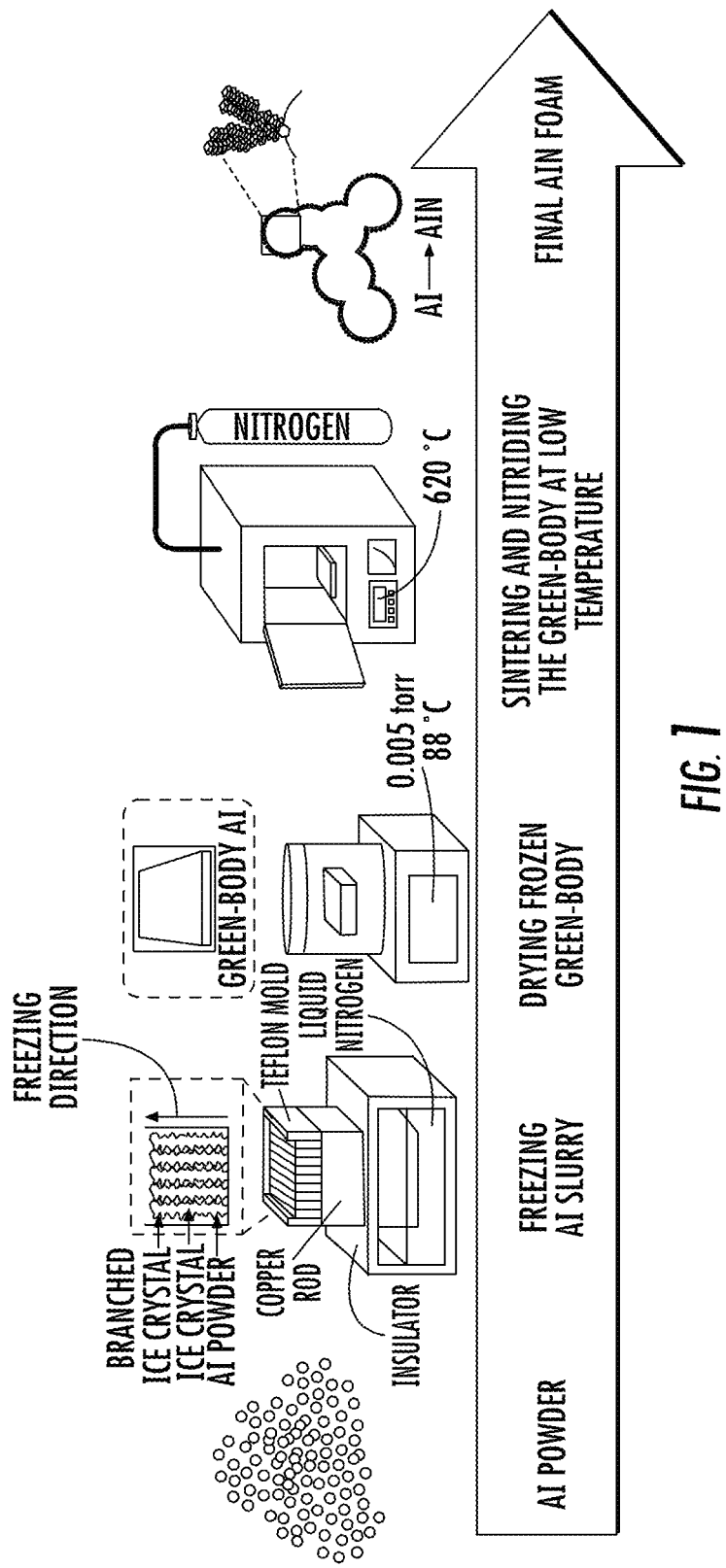
FIG. 1 schematically describes a processing flow from the preparation of starting aluminum powder slurry, freezing or drying, and sintering of porous aluminum green body, and finally synthesizing aluminum nitride foam via low-temperature nitridation.

Manufacturing the porous foam structure includes the steps: (a) preparing aluminum powder slurry mixed with PVA binder and water; (b) freezing the aluminum slurry when placed in a mold in contact with the cold surface of a copper rod; (c) sublimating the frozen slurry under reduced pressure and low temperature, forming a porous Al foam green body; (d) sintering and nitriding the porous aluminum foam green body at a low temperature of 620 degrees Celsius to transform into a 3D connected porous aluminum nitride foam under nitrogen gas.

A three-dimensionally (3D) connected porous structure of the aluminum nitride foam is created from the combination of the slurry freezing/sintering. Thermal nitriding methods can be used as an advanced material, which can provide higher surface area with unique aluminum nitride nanoparticles on the surface for potential use in various functional applications.

The temperature of 620 degrees Celsius is considered "unusually very low" because this nitriding temperature for metallic aluminum into aluminum nitride is noted as the lowest temperature ever achieved. For example, only surface nitridation (not even the fully complete nitridation) was achieved at 1000 degrees Celsius for 10 hours via a direct melt nitridation process for metallic aluminum.

The aluminum nitride foam is thus considered to be a reaction product resulting from nitridation, which started on the surface of the aluminum particles and then proceeded toward the inside of aluminum particles under the nitrogen atmosphere. The starting aluminum powder possessed the "native" oxide layer on the surface, which had been created from the contact with water in slurry preparation ($2Al+3H_2O \rightarrow Al_2O_3+H_2$). During the heat treatment for nitridation, the aluminum particle was then covered with a reaction layer containing nitrogen gas as the native aluminum oxide layer was combined with nitrogen gas ($Al_2O_3+N_2 \rightarrow 2AlON+1/2O_2$). The metastable aluminum oxynitride (AlON) could then be transformed into aluminum nitride ($AlON+1/2O_2 \rightarrow AlN+O_2$).

When the nitridation process normally occurs at a high temperature of over 2000 Kelvin, the wettability between the molten aluminum and aluminum nitride becomes considerable and the formation of aluminum nitride can be facilitated at the gas-melt interface and further away from the interface in the molten aluminum, which could lead to partial volume nitridation. This is because nitrogen bubbles are recombined at the surface of molten aluminum, resulting in the formation of aluminum nitride particles during the rise of the bubbles in the molten aluminum with high nitrogen content, which leads to the multiple nucleation of aluminum nitride crystals on the surface of the aluminum particle. Therefore, the morphology of the aluminum nitride synthesized at a high temperature typically shows a plate formation on the surface of aluminum with a stacking of aluminum nitride plates on the surface of the core aluminum. The appearance of the nanoparticle branches observed is in agreement with the surface morphology of nitrided aluminum powder at the temperature below 1273 Kelvin, suggesting that a limited growth mechanism of aluminum nitride crystals was also dominant on the surface in our porous aluminum nitride formation, as observed in aluminum powder, due mainly to the relatively low temperature.

Figure 4:
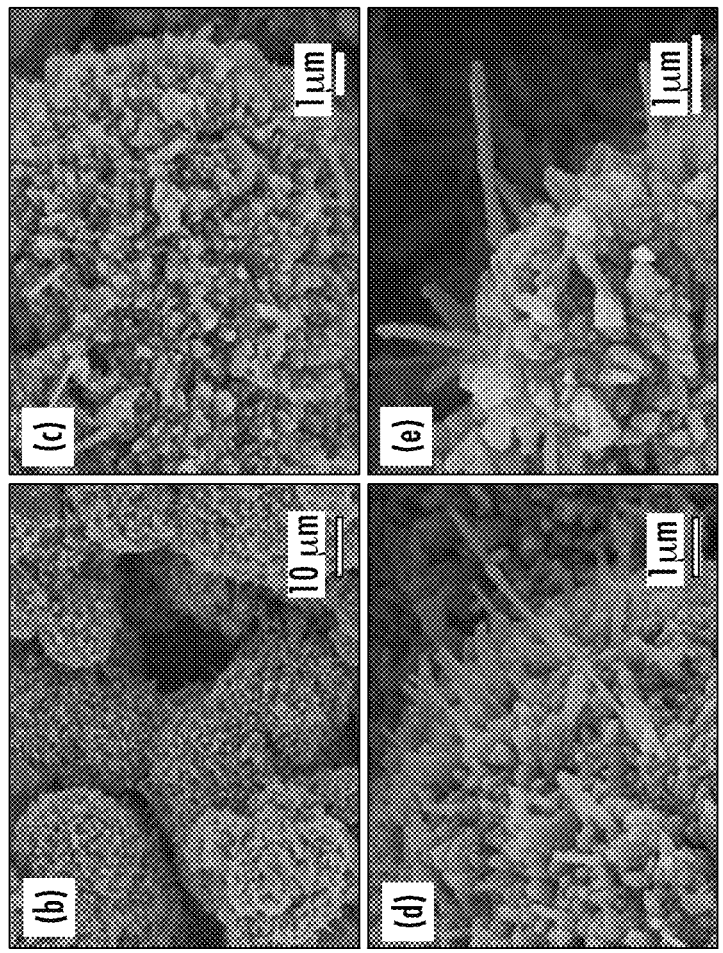
FIG. 4 shows surface morphologies: (a) schematic of the morphological formation mechanism on the surface of the synthesized aluminum nitride foam and (b-e) the SEM images of the surface morphology on the aluminum nitride foam with varying magnifications.
Figure 4:
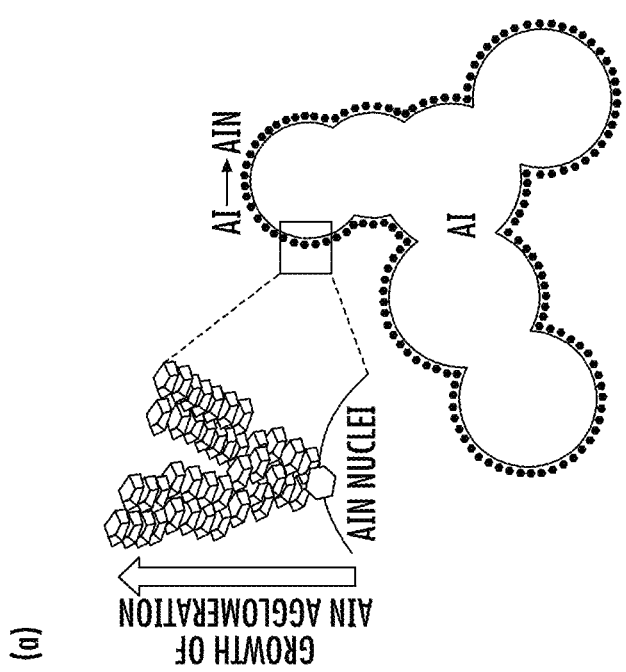

When aluminum particles came into contact with the nitrogen gas during the first stage of nitridation, the native oxide layer of the aluminum particle initially changed to a very thin aluminum oxynitride layer, and further nitridation proceeded through the diffusion of nitrogen through this layer (FIG. 4a). Therefore, the aluminum oxynitride shell acted as a nucleation site by supplying nitrogen atoms for the further growth of aluminum nitride. In the transition state from solid to liquid with reduced viscosity, the aluminum particles may have experienced stresses due to considerable thermal expansion. Some part of the aluminum nitride or aluminum oxynitride layer was then fractured and liquid-like aluminum flowed out of the fractured shell, forming aluminum droplets. The new aluminum nitride created in the droplets formed on top of the aluminum oxynitride layer and grew into the droplet, suggesting that the aluminum oxynitride shell played the role of a seed in the nitridation of the aluminum droplet. If a considerable number of droplets are formed from an active breakage of the aluminum nitride shell, the "fresh" aluminum can directly react with nitrogen gas; thus, the nitridation rate rapidly increases. Magnified morphological features are seen in FIGS. 4b-4e) for the stacking of aluminum nitride particles and rods on the surface of aluminum nitride foam, which supports the aforementioned aluminum nitride formation mechanism.

The detailed process for manufacturing of aluminum nitride foam can include the following steps:

(1) Placing a mold on a copper rod, or similar material with high thermal conductivity, immersed in liquid nitrogen (or a similar device that can lower the temperature significantly) and pouring the prepared aluminum slurry, containing water and binder (e.g., polyvinyl alcohol or PVA) in the mold. Herein, the presence of binder containing carbon is essential because it exerts a considerable impact on the nitridation of aluminum foam green body through a carbothermal process.

(2) Freezing the prepared aluminum powder slurry in the mold where the aluminum particles are piled up and physically attached between the growing ice crystals.

(3) Forming a aluminum foam green body by drying the ice crystals from the frozen slurry at sufficiently low temperature and reduced pressure (in a freeze dryer), leaving microscale pores in the aluminum foam green-body structure and retaining the physical attachments with the help of polyvinyl alcohol binder.

(4) Finally, constructing aluminum nitride foam with firmly connected pores by debinding (at relatively lower temperature) and sintering or nitriding the aluminum foam green body at sufficiently high temperature (620 degrees Celsius in this invention) under nitrogen atmosphere. Both the presence of carbon in the polyvinyl alcohol binder and the unique three dimensional (3D) porous structure of the Al foam are attributed to the unprecedentedly successful and complete transformation to aluminum nitride foam at such low temperature.

Exemplary Embodiment 1: Synthesizing Aluminum Nitride Foam

Aluminum powder (with an average particle size of less than 10 microns, 30 volume percent of a water-based solution) was suspended in a solution of deionized water containing polyvinyl alcohol (PVA) binder. The slurry was then dispersed by mechanical stirring for 1 hour and subsequently cooled to a few degrees above the freezing point of water and poured into a mold consisting of insulated polytetrafluoroethylene (PTFE) walls on a copper rod.

The copper rod was cooled using liquid nitrogen and controlled using a thermocouple and temperature controller. Once the freezing process was complete, the frozen greenbody sample was removed from the mold and sublimated at 185 Kelvin (−88 degrees Celsius) for 48 hours in a freeze-dryer under a 0.005-torr residual atmosphere.

The resultant green-body sample was transferred to a tube furnace, first heated to 573 Kelvin (300 degrees Celsius) for 3 hours to remove the polyvinyl alcohol binder, and then sintered and nitrided at 893 Kelvin (620 degrees Celsius) for 5 hours under an nitrogen gas atmosphere with heating and cooling rates of 5 degrees Celsius per minute and 3 degrees Celsius per minute, respectively. It is emphasized that the exemplary embodiment in this invention applied simultaneous sintering and nitriding process at such relatively low temperature enabled the complete transformation of the aluminum foam green body to aluminum nitride foam (FIG. 1).

Figure 2:
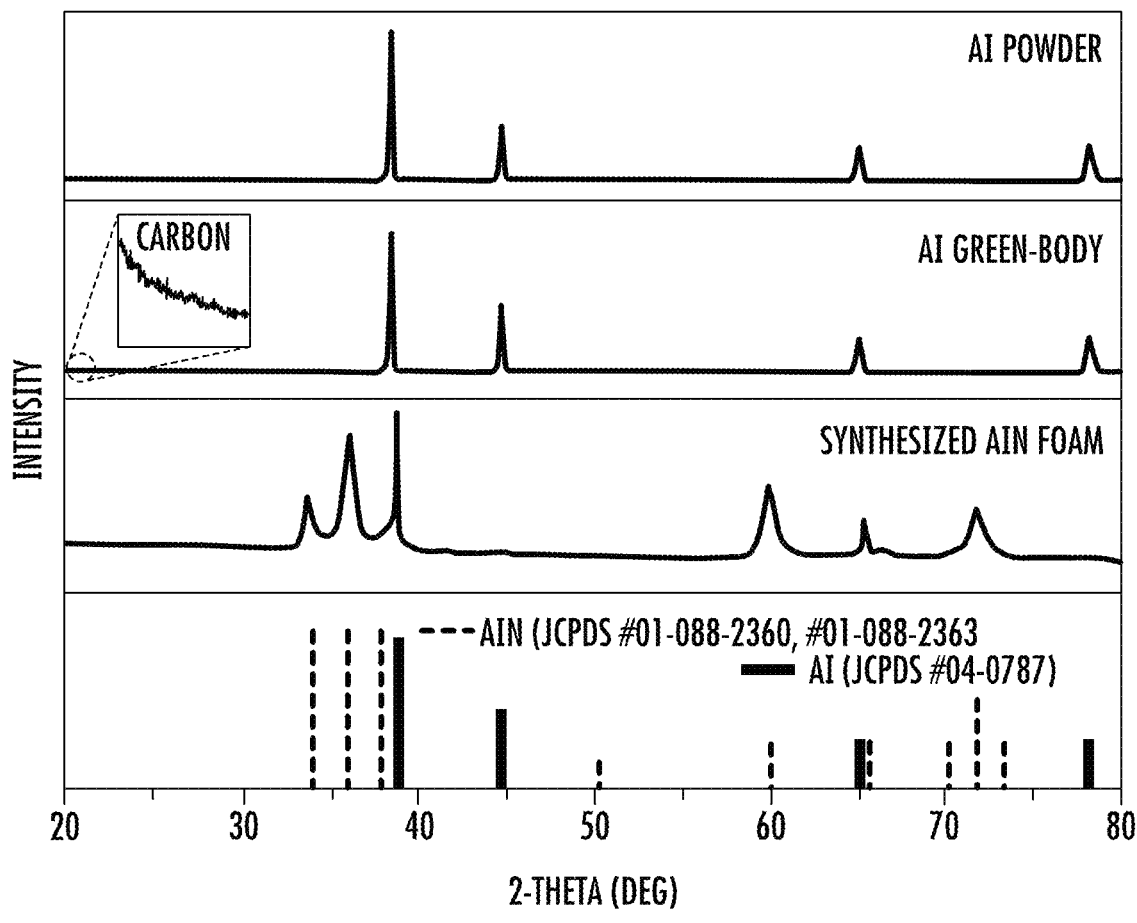
FIG. 2 shows comparison of XRD patterns of starting aluminum powder, frozen and dried aluminum green body, and the synthesized aluminum nitride foam after nitriding and sintering.

Exemplary Embodiment 2: Phase Analysis and Mechanical Properties of the Synthesized Aluminum Nitride Foam To confirm the complete transformation of porous aluminum into aluminum nitride foam, an XRD analysis was carried out. FIG. 2 compares the XRD patterns of the prepared Al foam green body and synthesized aluminum nitride foam, before and after the simultaneous nitrification/sintering process in a box furnace under a nitrogen gas atmosphere. The XRD patterns of aluminum powder and aluminum green body are essentially the same or identical except that gradually diminishing peaks are seen at around 20 degrees as magnified in the inset of the XRD pattern of the aluminum foam green body (FIG. 2), which indicates the presence of carbon in the aluminum foam green body due to the use of PVA for the slurry preparation. Most importantly, the starting aluminum powder was completely transformed to the aluminum nitride phase, as seen from the XRD pattern of the final synthesized aluminum nitride foam, which demonstrates that aluminum nitride foam product could be successfully achieved using us a simultaneous nitridation or sintering processing method at such low temperature of 620 degrees Celsius under an nitrogen atmosphere.

Figure 3:
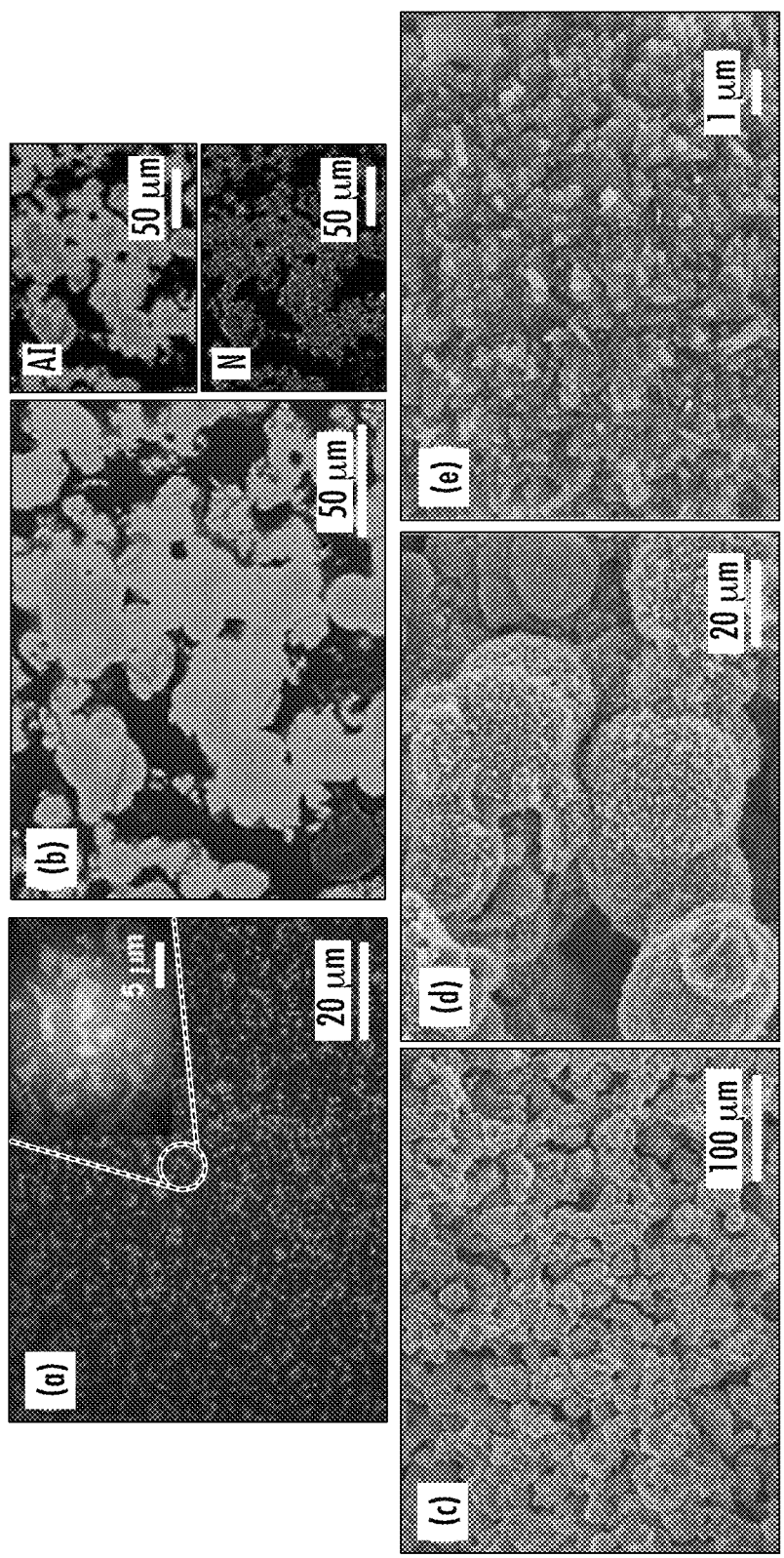
FIG. 3 shows morphological images of the final aluminum nitride foam: (a) top-view optical image of a mounted and polished aluminum nitride foam, (b) SEM image of the mounted and polished aluminum nitride sample and the corresponding elemental EDS mapping images, (c, d) SEM images of the synthesized aluminum nitride foam after nitriding and sintering, and (e) the morphology of nanoparticles formed on the surface of the aluminum nitride foam.

The optical image in FIG. 3a shows the porous microstructure of the final aluminum nitride foam with the inset showing a magnified microstructure; note that the black areas in FIG. 3a correspond to the epoxy resin that was used to fill the pores during the metallographic mounting. The mean pore size and wall width were measured as 74.0 plus or minus 27.7 microns and 29.1 plus or minus 6.3 microns, respectively; additionally, the porosities measured by the image analysis and physical measurement methods were 72.4 percent and 79.2 percent, respectively; the estimated some 70 percent porosity for the sample obtained in this invention is considered sufficiently high for potential use in a variety of functional applications that can utilize its large surface area.

As confirmed from the SEM and corresponding EDS images in FIG. 3b, the presence of an aluminum nitride phase was clearly identified throughout the entire sample area. SEM micrographs of the final aluminum nitride foam in FIGS. 3c-3e also show a uniform microscale pore structure with aluminum nitride nanostructures grown from the surface of aluminum nitride foam struts.

The porous aluminum nitride could be achieved by reacting the prepared porous aluminum foam green body with the surrounding nitrogen gas molecules that were dissociated into nitrogen atoms, the nuclei of aluminum nitride nanoparticles were created and enriched on the surface of aluminum, and the nuclei then acted as a template for the further volumetric growth of the aluminum nitride particles, as shown by the schematic diagram of the representative aluminum nitride morphology formed in FIG. 4a. The unique three-dimensional porous structure of the prepared aluminum foam green body could further assist the creation of aluminum nitride nanoparticles on the surface of aluminum.

Figure 5A:
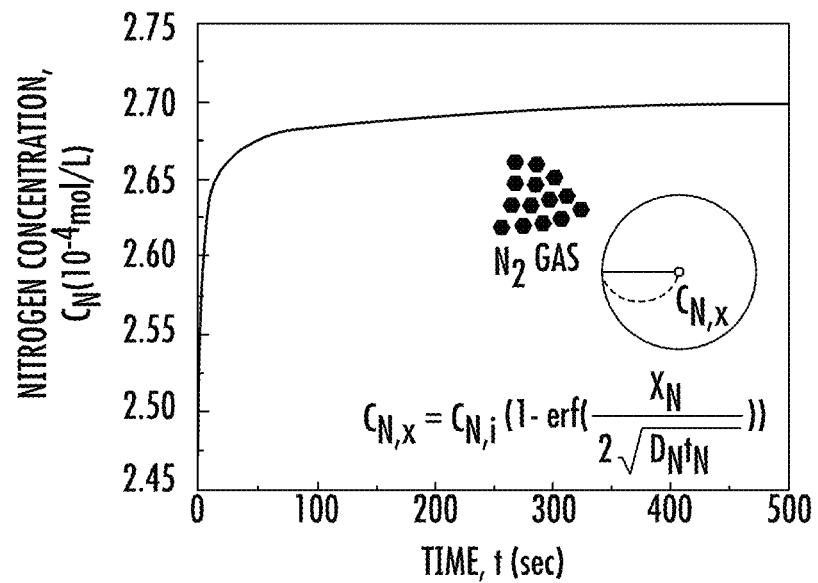
FIGS. 5A-5B shows predicted diffusional profiles of nitrogen atoms in aluminum green-body foam during nitriding/sintering: (5A) the nitrogen atom concentration prediction as a function of time in the strut of aluminum foam on the basis of Fick's second law and (5B) the diffusion distance prediction of nitrogen atoms in the strut of aluminum foam as a function of time.
Figure 5B:
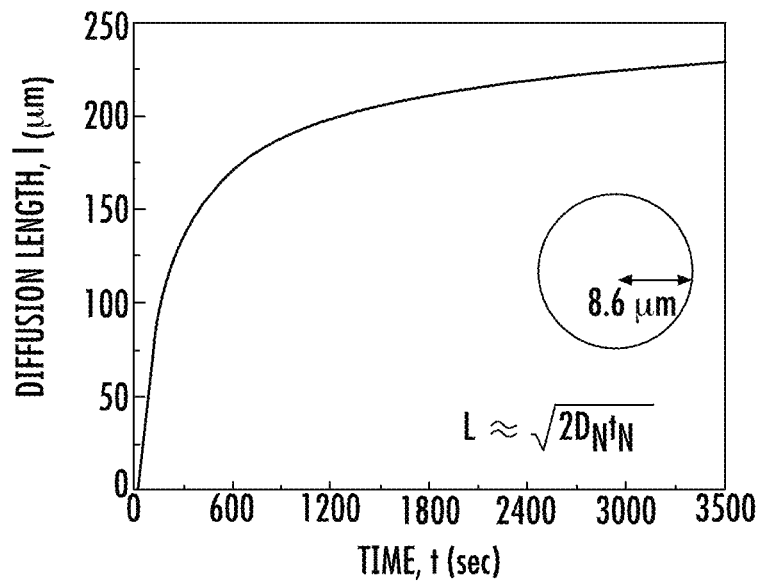

The reaction of nitrogen atom diffusion is determined by the concentration gradient in the aluminum boundary layer and is affected by the chemical reaction between nitrogen and aluminum atoms to form the aluminum nitride particles at the interface both in the aluminum boundary layer and the aluminum core. The diffusion of nitrogen in aluminum can be estimated by Fick's second law. According to FIG. 5A, the nitrogen atom concentration was saturated at $2.7 \times 10^{-4}$ after 200 seconds. Furthermore, FIG. 5B shows that the nitrogen atoms could diffuse up to 100 microns into the aluminum strut after 300 seconds.

Figure 6A:
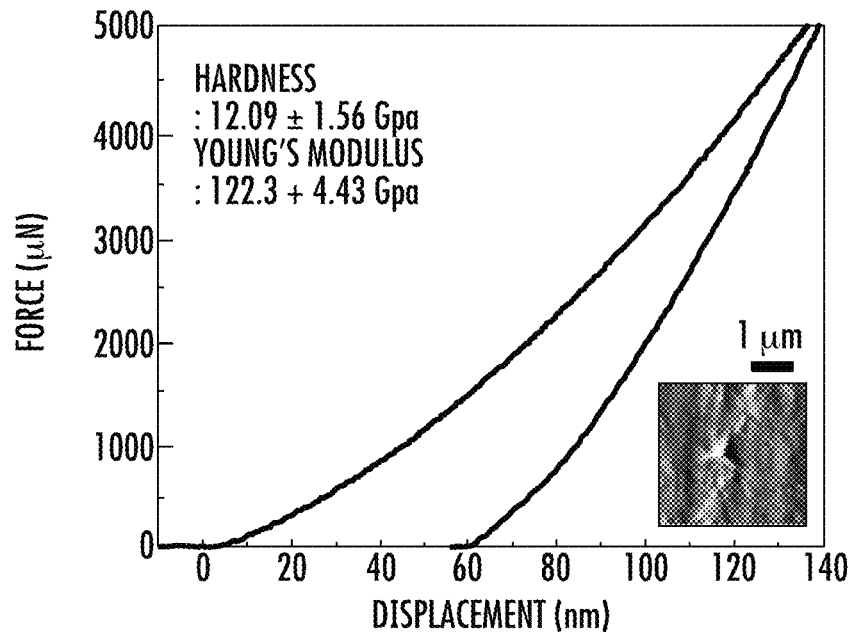
FIGS. 6A-6C show nanoindentation test results of the synthesized aluminum nitride foam: (6A) the load-displacement curve with a peak load of 5000 micronewtons with the in-situ optical inset image showing the corresponding indentation impression, (6B) variations of elastic modulus and hardness values as a function of the indentation load from 4000 to 10,000 micronewtons, and (6C) surface roughness image of the synthesized aluminum nitride foam with a mean roughness value of 550 nanometers.

Nano-indentation testing was used to determine the physical and mechanical properties of the struts of the synthesized aluminum nitride foam. Given the dimensions of a few tens of micrometers of the strut, the physical and mechanical properties of aluminum nitride foam were characterized using the nanoindentation test with the micrometer-scale Berkovich diamond tip. FIG. 6A displays a representative force versus displacement curve with calculation results of the Young's modulus and hardness values obtained from the nanoindentation test curve, where the peak load is 5000 micronewtons and the maximum indentation depth is 148 nanometers. The Young's modulus (E) of 122.3 plus or minus 4.4 gigapascals (GPa) and an indentation hardness (H) of 12.1 plus or minus 1.6 gigapascals were obtained. The inset image in FIG. 6A shows an optical image of an indentation impression under a peak load of 5000 microns with a mean diameter of about 1 micron and no pile-up observed near the impression.

Figure 6B:
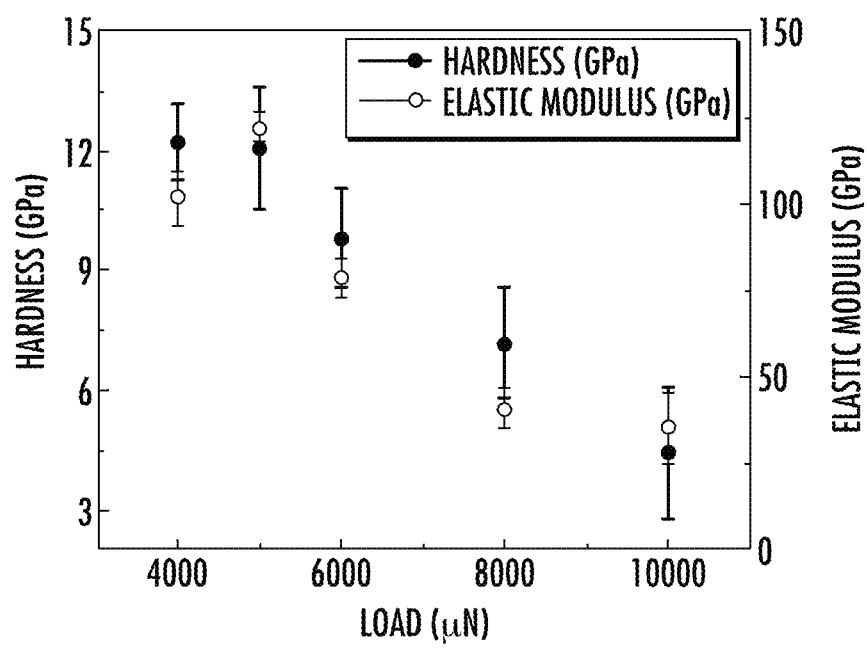

The load dependence of E and H of the aluminum nitride foam is also shown in FIG. 6B, with their values varying in the range of 35.7-122.3 gigapascals and 4.4-12.2 gigapascals, respectively.

Figure 6C:
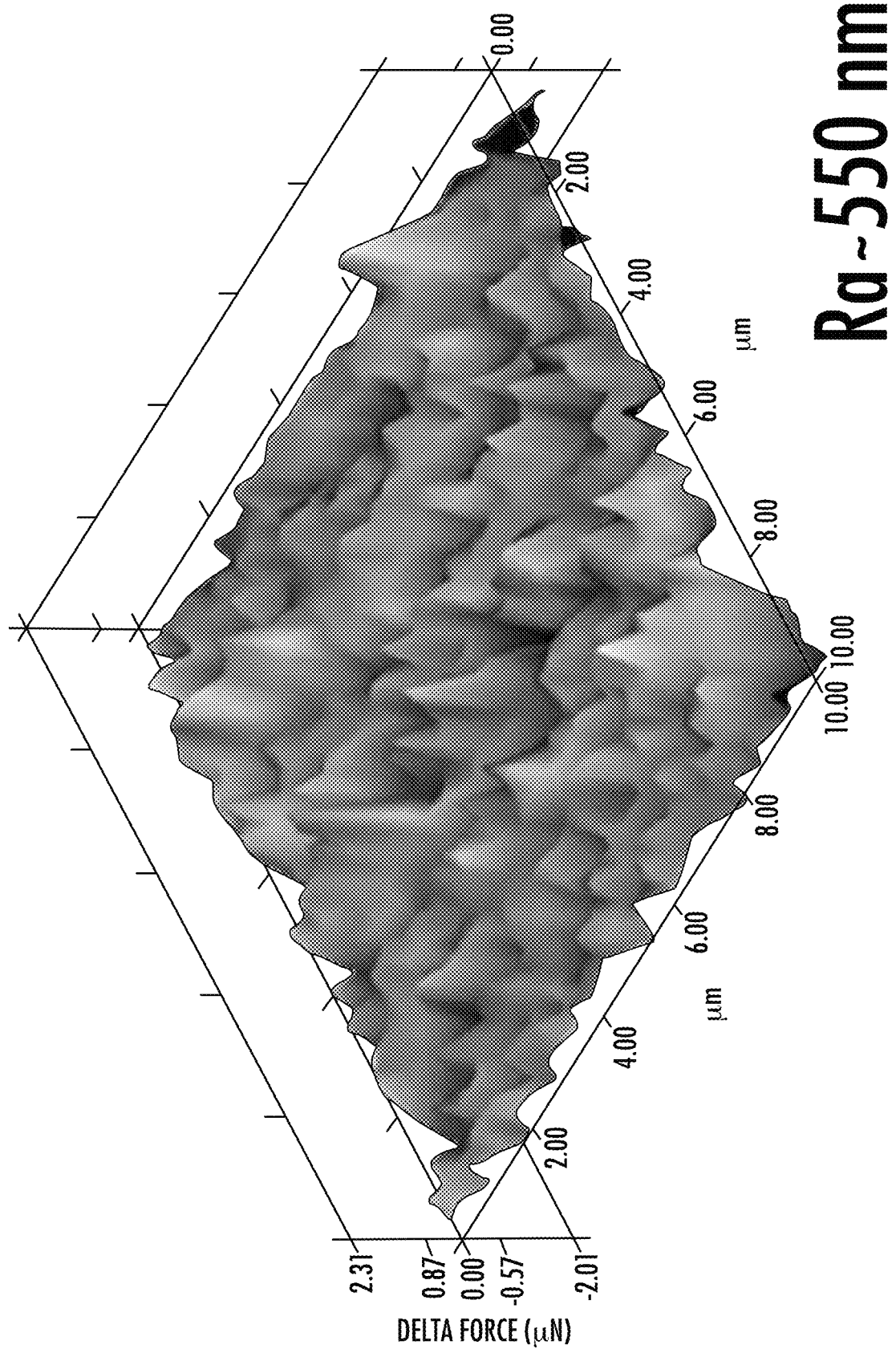

The surface roughness of an aluminum nitride strut was measured quantitatively using the corresponding nanoindentation image (FIG. 6C). The average surface roughness (Ra) value of the aluminum nitride strut surface was estimated to be 550 nanometers.

The hardness and elastic modulus data obtained from the nanoindentation test were also used to calculate the Gilman-Chen parameter (H/G) for the aluminum nitride foam manufactured using this technique to determine the dominant type of bonding. The H/G value for our aluminum nitride foam material was roughly 0.2, suggesting that its dominant bonding type should be covalent. This result is in good agreement with the strong covalent nature of the generally known bonding for bulk aluminum nitride.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

This invention claims:

1. An article of manufacture comprising an aluminum nitride (AlN) foam comprising a porous structure with regularly distributed pores on the order of nanometers and micrometers, which has been manufactured through direct nitridation in a nitrogen atmosphere at a relatively low temperature of less than about 1000 degrees Celsius, wherein the aluminum nitride foam has a porosity of about 60 percent to 80 percent.

2. The manufacture of claim 1 wherein the various functional applications comprise at least one of filters, separators, heat sinks, ballistic armor, electronic packaging, light- and field-emission devices, and wear-resistant composites when infiltrated with a metal comprising at least one of aluminum, titanium, or copper.

3. The manufacture of claim 1 where the starting material was aluminum powder mixed with water or another solvent and a binder.

4. The manufacture of claim 1 wherein a synthesis method comprises slurry freezing or drying, or a combination, and thermal sintering or nitriding methods, or a combination.

5. The manufacture of claim 1 wherein a process of making the aluminum nitride (AlN) foam comprises a low-temperature freezing or drying of a prepared aluminum powder slurry to make an aluminum foam green body, or a combination.

6. The manufacture of claim 5 wherein a process of making the aluminum nitride (AlN) foam comprises the aluminum foam green body is then subjected to a simultaneous low-temperature nitrification and sintering process for the complete transformation to aluminum nitride foam in a nitrogen atmosphere, resulting in a three-dimensional pore structure with uniformly distributed pores.

7. The manufacture of claim 6 wherein the process of making does not require an additive or pressure application for a sintering or nitriding process, or a combination of a sintering and nitriding process, and allows the aluminum foam green body to sinter at temperatures between about 500 degrees Celsius and about 900 degrees Celsius.

8. The manufacture of claim 7 whereby the temperature used during sintering allows for a low-temperature nitriding process that enables a scalable manufacturing of aluminum nitride foam, which could not previously be achieved through the conventional higher temperature aluminum nitride nitriding processes.

9. The manufacture of claim 3 wherein the binder comprises a polyvinyl alcohol (PVA) binder or any other binder comprising carbon, or a combination.

10. The manufacture of claim 9 wherein the binder is used in the preparation of a water-based aluminum powder slurry.

11. An article of manufacture comprising an aluminum nitride (AlN) foam comprising a porous structure with regularly distributed pores on the order of nanometers, which has been manufactured through direct nitridation in a nitrogen atmosphere at a temperature of less than about 1000 degrees Celsius,
wherein the aluminum nitride foam has a porosity of about 60 percent to 80 percent.

12. The article of claim 11 wherein a load-displacement curve comprises a first point at a force of about 500 micronewtons and a displacement of between about 28 to 32 nanometers, a second point at a force of about 1000 micronewtons and a displacement of between about 48 to 52 nanometers, and a third point at a force of about 2000 micronewtons and a displacement of between about 78 to 82 nanometers.

13. The article of claim 11 wherein at a load of 8000 micronewtons, the aluminum nitride foam has a hardness of about 6 to 8.8 gigapascals and an elastic modulus of about 35 to 45 gigapascals.

14. The article of claim 11 wherein the aluminum nitride foam has a surface roughness average of about 500 to 600 nanometers.

15. An article of manufacture comprising an aluminum nitride (AlN) foam comprising a porous structure with regularly distributed pores on the order of nanometers, which has been manufactured through direct nitridation in a nitrogen atmosphere at a temperature of less than about 1000 degrees Celsius,
wherein the aluminum nitride foam has a porosity of about 60 percent to 80 percent,
a load-displacement curve comprises a first point at a force of about 500 micronewtons and a displacement of between about 28 to 32 nanometers, a second point at a force of about 1000 micronewtons and a displacement of between about 48 to 52 nanometers, and a third point at a force of about 2000 micronewtons and a displacement of between about 78 to 82 nanometers, and
at a load of 8000 micronewtons, the aluminum nitride foam has a hardness of about 6 to 8.8 gigapascals and an elastic modulus of about 35 to 45 gigapascals.

16. The article of claim 15 wherein the aluminum nitride foam has a surface roughness average of about 500 to 600 nanometers.

* * * * *